United States Patent
Kurosawa

(10) Patent No.: US 7,440,716 B2
(45) Date of Patent: Oct. 21, 2008

(54) IMAGE COPYING APPARATUS AND IMAGE COPYING METHOD

(75) Inventor: Norio Kurosawa, Shizuoka-Ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 243 days.

(21) Appl. No.: 11/278,219

(22) Filed: Mar. 31, 2006

(65) Prior Publication Data

US 2007/0236555 A1 Oct. 11, 2007

(51) Int. Cl.
G03G 15/04 (2006.01)
H04N 1/393 (2006.01)

(52) U.S. Cl. .................................. 399/193; 358/451
(58) Field of Classification Search ................ 399/193; 358/449–451
See application file for complete search history.

(56) References Cited

U.S. PATENT DOCUMENTS 5,625,466 A * 4/1997 Nakajima ................... 358/449
5,774,232 A * 6/1998 Tabata et al. ............... 358/448
6,094,552 A * 7/2000 Haneda et al. .............. 399/193
2003/0160977 A1* 8/2003 Nishikawa et al. ......... 358/1.18

FOREIGN PATENT DOCUMENTS

JP 2002-118700 A 4/2002

* cited by examiner

Primary Examiner—Ryan Gleitz
(74) Attorney, Agent, or Firm—SoCal IP Law Group LLP; Steven C. Sereboff; John E. Gunther

(57) ABSTRACT

An image copying apparatus includes a control panel to a user interface; a scanner; a memory that stores an image; an image rotation processing unit that rotates the image depending on the direction in which the image is to be printed; a printer; a printer controller; and a system controller. The printer includes a light-emitting element, an image printing start position adjusting element that adjusts a start position of a printing position of the image to be printed, an image printing area adjusting element that sets a printing area of the image to be printed, a polygon mirror, and a polygon motor. According to the image copying apparatus, even when the size of a read image has been adjusted at the time of printing, the printing results of the same manuscript can be made the same regardless of differences in the printing direction.

5 Claims, 4 Drawing Sheets

IMAGE COPYING APPARATUS AND IMAGE COPYING METHOD

BACKGROUND OF THE INVENTION

1. Technical Field of the Invention

The present invention relates to an image copying apparatus and an image copying method, and in particular to an image copying apparatus and an image copying method that make the printing results of the same manuscript the same, regardless of differences in the printing direction, even when the size of a read image has been adjusted at the time of printing.

2. Related Art

Conventional image copying apparatus and image copying methods adjust a printing area such that the printing result becomes the same as a manuscript.

For example, when the scale factor of a scanner is less than 100%, such as 99%, conventional image copying apparatus and image copying methods conduct printing at about 101% at the time of image formation as a result of conducting adjustment of the printing scale factor such that the printing result becomes the same as the manuscript. At this time, an image portion exceeding 100% is not printed.

Further, the directions in which an image is formed include a direction in which an image is formed without rotating a read image and a direction in which an image is formed after rotating the read image 180° When an image is rotated 180° and formed in a case where the printing scale factor after adjustment exceeds 100% as in the above-described example, an image cropped by the printing area becomes formed backwards because the printing start position and the printing area of the image are fixed.

In other words, the position of an image that exceeds the printing area (100%) and is cropped differs between when image formation is conducted without rotating the read image and when image formation is conducted after rotating the read image. Consequently, a difference emerges in the image printed on paper.

Conversely, when the scale factor of the scanner exceeds 100%, such as 101%, conventional image copying apparatus and image copying methods conduct printing at about 99% at the time of image formation as a result of conducting adjustment of the printing scale factor such that the printing result becomes the same as the manuscript. At this time, an image portion less than 100% is handled as a margin. In other words, a margin portion becomes added to the image.

When an image is formed after rotating the read image 180 degrees when the printing scale factor after adjustment is less than 100% as in the above-described example, the image to which the margin has been added becomes formed backwards because the printing start position and the printing area of the image are fixed. Consequently, a difference emerges in the image printed on paper between when image formation is conducted without rotating the read image and when image formation is conducted after rotating the read image.

Thus, an image copying apparatus and an image copying method have been proposed which make the printing results of the same manuscript the same, regardless of differences in the printing direction, even when the size of a read image has been adjusted at the time of printing.

For example, known examples relating to the invention include Japanese Patent Application Publication (JP-A) No. 2002-118700. The image copying apparatus disclosed in JP-A No. 2002-118700 adjusts the feeding timing of image signals and/or the feeding timing of paper, whereby a read image is printed at an appropriate position on paper even when the read image is larger than the printable area.

However, in the image copying apparatus disclosed in JP-A No. 2002-118700, it is necessary to exquisitely adjust the feeding timing of the image signals and/or the feeding timing of the paper.

Thus, an image copying apparatus and an image copying method are desired which make, by control that is easier than in conventional image copying apparatus, the printing results of the same manuscript the same, regardless of differences in the printing direction, even when the size of a read image has been adjusted at the time of printing.

SUMMARY OF THE INVENTION

The invention has been made in view of the above circumstances, and it is an object thereof to provide an image copying apparatus and an image copying method that make the printing results of the same manuscript the same, regardless of differences in the printing direction, even when the size of a read image has been adjusted at the time of printing.

The image copying apparatus according to the invention comprises: a control panel that includes an input unit which receives input operations from a user and a display unit which displays information to the user; a scanner that reads an image; a memory that stores the image read by the scanner; an image rotation processing unit that rotates the image in accordance with the direction in which the image is to be printed; a printer that forms an image, transfers the image to and fixes the image on paper, and discharges the paper; a printer controller that controls the printer; and a system controller that controls the entire apparatus, wherein the printer is disposed with a laser unit that forms a latent image on a drum, and the laser unit includes a light-emitting element that emits laser light such as a semiconductor laser, an image printing start position adjusting element that adjusts a start position of a printing position of the image to be printed, an image printing area adjusting element that sets a printing area of the image to be printed, a polygon mirror that causes the laser light emitted from the light-emitting element to be reflected toward the drum, and a polygon motor that drives the polygon mirror.

The image copying method of the invention comprises: a printing direction determining step that determines the printing direction of an image; a printing parameter setting step that conducts setting of printing parameters when conducting printing in a direction different from a printing direction serving as a reference; and a printing step that conducts printing on the basis of the printing parameters set in the printing parameter setting step.

According to the image copying apparatus and the image copying method pertaining to the invention, the printing results of the same manuscript can be made the same, regardless of differences in the printing direction, even when the size of a read image has been adjusted at the time of printing.

DETAILED DESCRIPTION OF THE PREFERRED EMBODIMENTS

Embodiments of an image copying apparatus and an image copying method pertaining to the invention will be described with reference to the attached drawings.

Figure 1:
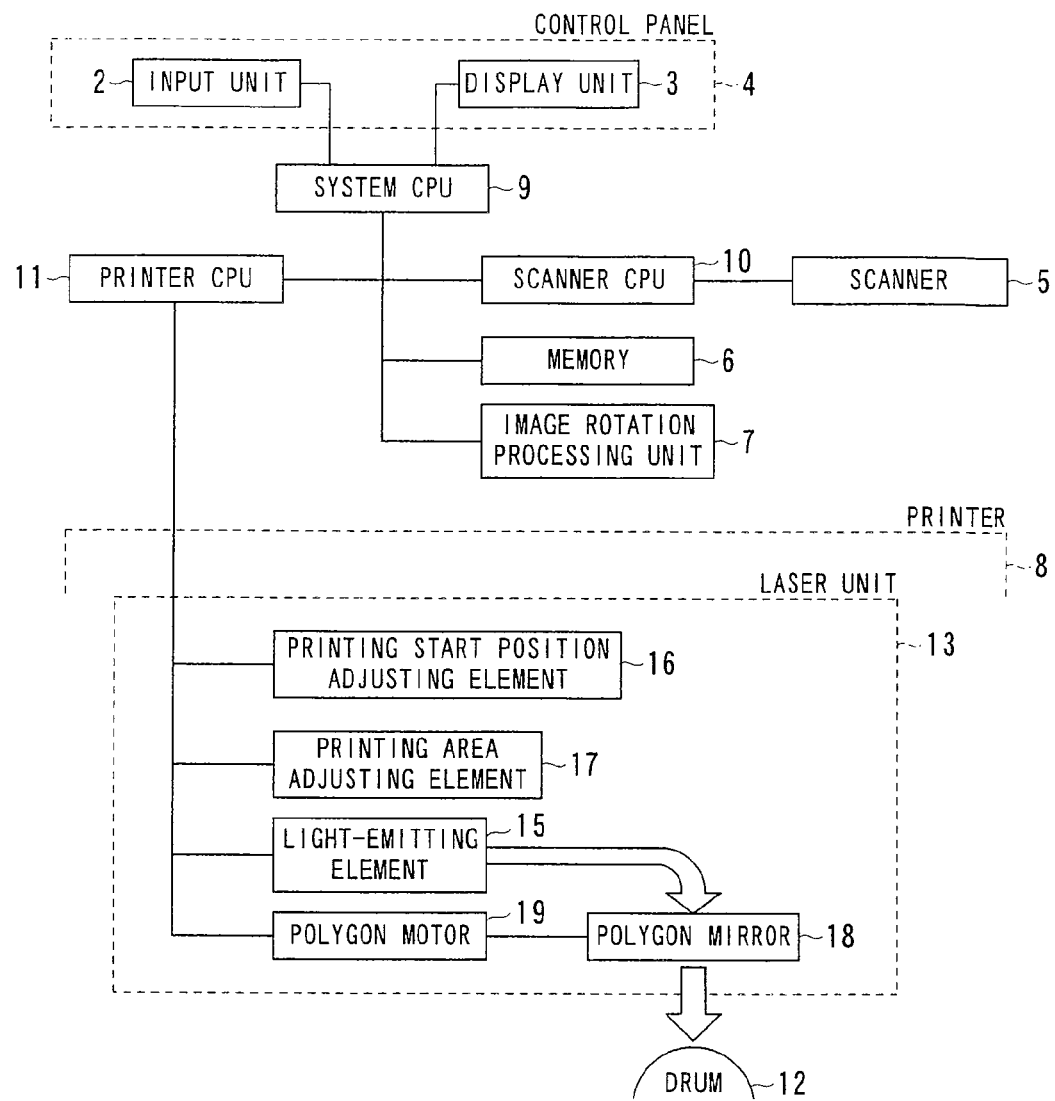
FIG. 1 is a diagram schematically showing the configuration of an image copying apparatus pertaining to the invention.

FIG. 1 is a diagram schematically showing the configuration of an image copying apparatus 1, which is an example of the image copying apparatus pertaining to the invention.

The image copying apparatus 1 is equipped with: a control panel 4 as a user interface that includes an input unit 2 which receives input operations from a user and a display unit 3 which displays information to the user, a scanner 5 that reads an image; a memory 6 that stores the image read by the scanner 5; an image rotation processing unit 7 that rotates the read image in accordance with the direction in which the read image is to be printed; a printer 8 that forms an image, transfers the image to and fixes the image on the paper, and discharges the paper; a system CPU (Central Processing Unit) 9 that controls the entire apparatus; a scanner CPU 10 that controls the scanner 5; and a printer CPU 11 that controls the printer 8.

The printer 8 is disposed with a laser unit 13 that forms a latent image on a drum 12. The laser unit 13 includes: a light-emitting element 15 that emits laser light such as a semiconductor laser; an image printing start position adjusting element 16 that adjusts a start position of a printing position of the image that has been disposed and is to be printed; an image printing area adjusting element 17 that sets a printing area of the image to be printed; and a polygon motor 19 that drives a polygon mirror 18 that causes the laser light emitted from the light-emitting element 15 to be reflected toward the drum 12.

The action of the image copying apparatus 1 will be described.

The image copying apparatus 1 conducts adjustment of the printing scale factor such that the printing result becomes the same as the manuscript. Yet sometimes the scale factor of the scanner 5 is not 100%. When the scale factor of the scanner 5 is not 100%, the image copying apparatus 1 adjusts the scale factor in the main scanning direction of the printer 8 (below, main scanning scale factor) and conducts adjustment of the printing scale factor such that the printing result becomes the same as the manuscript.

For example, when the scale factor of the scanner is 99%, the image copying apparatus 1 adjusts the main scanning scale factor of the printer 8 to about 101% and conducts printing. At this time, an image portion exceeding 100% is not printed.

Conversely, when the scale factor of the scanner 5 is 101%, the image copying apparatus 1 adjusts the main scanning scale factor of the printer 8 to about 99% and conducts printing. At this time, an image portion less than 100% is handled as a margin. In other words, a margin portion is added to the image.

The image copying apparatus 1 can conduct printing in a mode that prints an image in a direction in which the image is not rotated (below, forward direction printing mode) and a mode that prints an image in a direction in which the image has been rotated 180° (below, reverse direction printing mode). The image copying apparatus 1 conducts control of the printing start position and the printing area (sizes of printing start side margin and printing end side margin) such that the image to be printed becomes the same even if printing is conducted in either of the forward direction printing mode and the reverse direction printing mode.

In the following description, a case will be described where the image copying apparatus 1 uses the printing direction when printing in the forward direction printing mode as a reference direction at the time of image printing. That is, a case will be described where the image copying apparatus 1 adjusts the printing start position and the printing area when printing in the reverse direction mode.

In the image copying apparatus 1, when the forward direction printing mode has been selected, the image rotation processing unit 7 outputs an image read from the memory 6 to the laser unit 13 as is without rotating the image (0° rotation) When the reverse direction printing mode has been selected, the image rotation processing unit 7 rotates an image read from the memory 6 180° and outputs the rotated image to the laser unit 13.

In the laser unit 13, when the forward direction printing mode has been selected, the image printing start position adjusting element 16 and the image printing area adjusting element 17 set printing parameters on the basis of set values, and the polygon motor 19 drives the polygon mirror 18 in accordance with the main scanning scale factor.

When the reverse direction printing mode has been selected, the image printing start position adjusting element 16 and the image printing area adjusting element 17 set printing parameters after conducting adjustment of the set values, and the polygon motor 19 drives the polygon mirror 18 in accordance with the main scanning scale factor.

The image printing start position adjusting element 16 adjusts and sets the start position of the printing position of the image in accordance with the printing direction of the image, that is, the image printing mode.

The image printing area adjusting element 17 sets the sizes of the margins at the printing start side and the printing end side as the printing area of the image to be printed.

The polygon motor 19 receives from the printer CPU 11 a control signal generated on the basis of information of the main scanning scale factor of the printer 8 and drives the polygon mirror 18. That is, the polygon motor 19 drives the polygon mirror 18 in accordance with the main scanning scale factor of the printer 8.

Figure 2A:
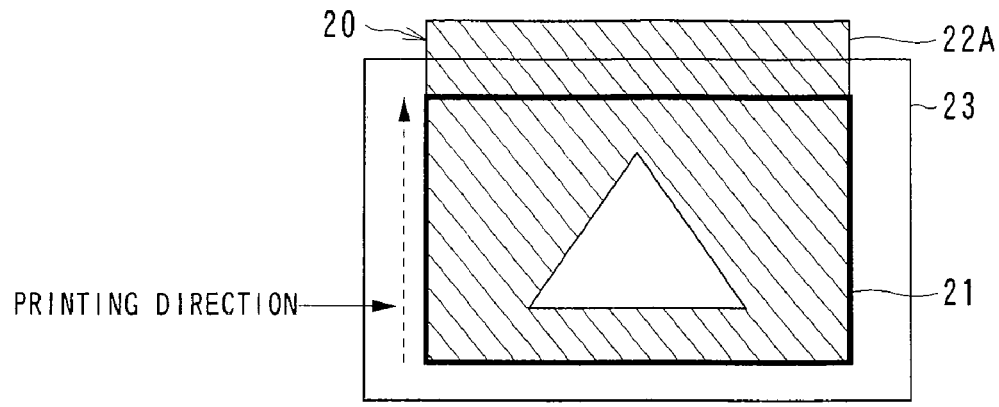
FIG. 2A is a diagram describing a printing result where, in the image copying apparatus pertaining to the invention, a read image that has become larger than a printable area of the image copying apparatus as a result of a main scanning scale factor of a printer being adjusted is printed in a forward direction printing mode.
Figure 2B:
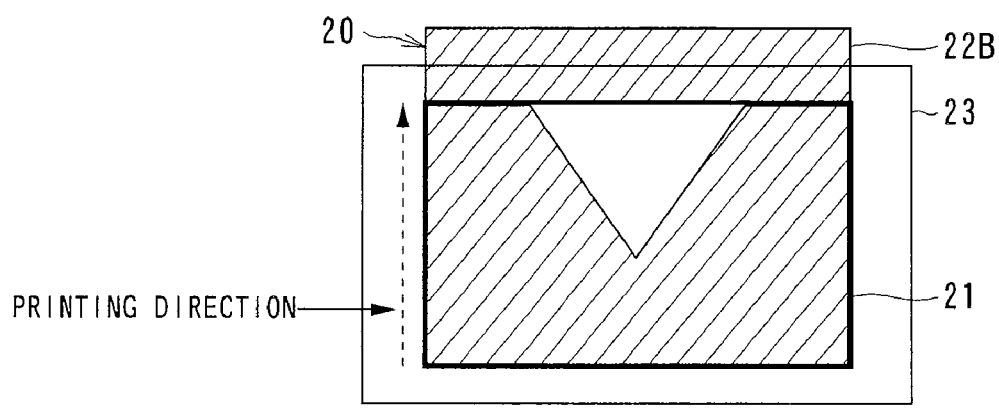
FIG. 2B is a diagram describing a printing result where a conventional image copying apparatus has printed the read image shown in FIG. 2A in a reverse direction printing mode.
Figure 2C:
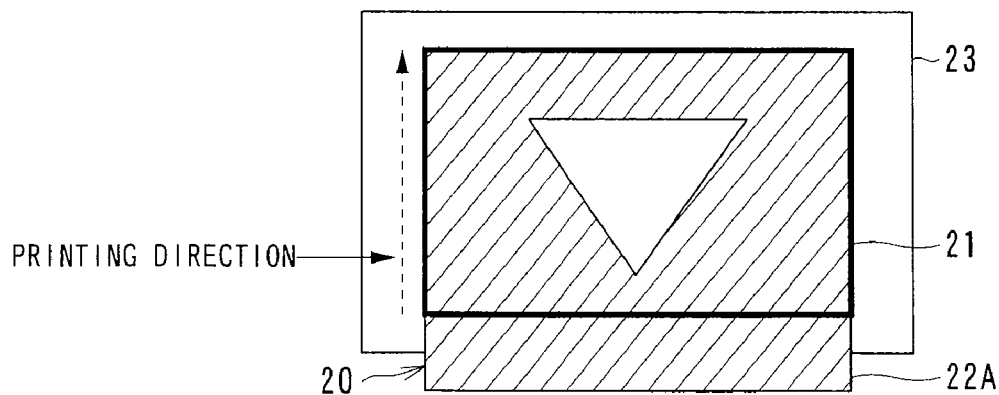
FIG. 2C is a diagram describing a printing result where the image copying apparatus pertaining to the invention has printed the read image shown in FIG. 2A in the reverse direction printing mode.

FIG. 2A is a diagram describing an image that is printed when a read image that has become larger than a printable area of the image copying apparatus 1 as a result of the main scanning scale factor of the printer 8 being adjusted is printed in the forward direction printing mode. FIG. 2B is a diagram describing an image that is printed when a conventional image copying apparatus has printed the read image shown in FIG. 2A in the reverse direction printing mode. FIG. 2C is a diagram describing an image that is printed when the image copying apparatus 1 has printed the read image shown in FIG. 2A in the reverse direction printing mode.

As shown in FIG. 2A, when a read image 20 exceeds 100% as a result of the main scanning scale factor of the printer 8 being adjusted at the time of image formation, that is, when the read image 20 will not fit in a printable area 21, the image copying apparatus 1 is set such that an image portion (below, called excess area) 22A that exceeds 100% from the leading end of the read image 20 is not printed. Consequently, an image from which the excess area 22A has been cropped from the read image 20 is printed in the printable area 21 of paper 23.

When the printing direction is reversed, that is, in the case of the reverse direction printing mode, in the conventional image copying apparatus, the printing start position becomes the trailing end of the read image 20, so an excess area 22B that exceeds 100% counted in the forward direction from the trailing end is cropped from the read image 20 and printed in the printable area 21 of the paper 23. Consequently, as shown in FIG. 2B, the image printed in the printable area 21 is different from the image in the case of the forward direction printing mode shown in. FIG. 2A.

In contrast, in the image copying apparatus 1, as shown in FIG. 2C, in the case of the reverse direction printing mode, the printing start position shown in FIG. 2B is shifted forward (in the opposite direction of the printing direction shown in FIG. 2C) an amount equal to the excess area 22B, and the image portion that is not to be printed is shifted to the printing start side. The image portion that is not to be printed at the printing start side is the excess area 22A.

Consequently, in the image copying apparatus 1, even in the case of the reverse direction printing mode, the image portion that is not to be printed of the read image 20 is the same as the excess area 22A, so an image that is the same as in the case of the forward direction printing mode becomes printed in the printable area 21 of the paper 23.

When the read image 20 has become less than 100% as a result of the main scanning scale factor of the printer 8 being adjusted at the time of image formation, that is, when a margin is added to the trailing end side of the read image 20 and fits in the printable area 21, the margin portion is adjusted such that it is shifted to the printing start side. As a result, the printing result in the reverse direction printing mode and the printing result in the forward direction printing mode become the same.

Next, the image copying method pertaining to the invention will be described.

The image copying method pertaining to the invention is implemented as a result of the image copying apparatus 1 executing an image copying step, for example.

Figure 3:
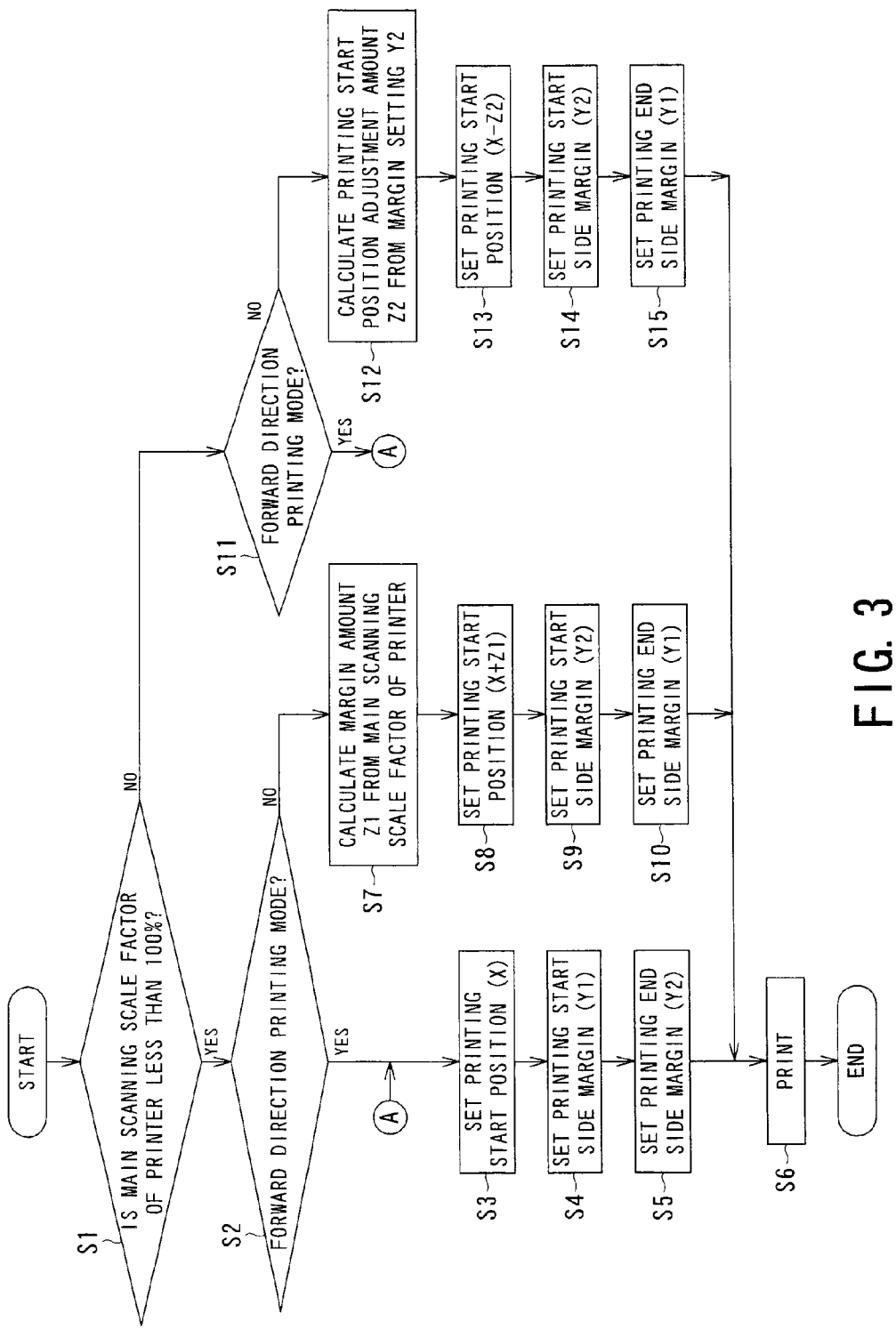
FIG. 3 is a processing flow diagram of an image copying method (when conducting adjustment in a main scanning direction) pertaining to the invention.

FIG. 3 is a processing flow diagram of the image copying step (when conducting adjustment in the main scanning direction) that the image copying apparatus 1 executes.

The image copying step when conducting adjustment in the main scanning direction (below, main scanning image adjustment copying step) includes: a printing direction determining step (step S2, step S11) that determines the printing direction of an image; a printing parameter setting step (step S7 to step S15) that conducts setting of printing parameters when printing from the direction opposite from the reading direction of the image to be printed (NO in step S2; NO in step S11); and a printing step (step S6) that conducts printing on the basis of the set printing parameters.

The printing parameter setting step includes: a margin calculating step (step S7) that calculates a margin portion arising within the printable range on the basis of the main scanning scale factor of the printer 8 and the reading scale factor of the scanner 5 when the main scanning scale factor of the printer 8 is less than 100% (YES in step S1); a first printing start position adjusting step (step S8) that adjusts and sets the printing start position on the basis of the size of the margin portion calculated in the margin calculating step; a first printing start side margin adjusting step (step S9) that adjusts and sets the size of a margin portion at a printing start side on the basis of an adjustment amount calculated in a printing position adjustment amount calculating step; a first printing end side margin adjusting step (step S10) that adjusts and sets the size of a margin portion at a printing end side on the basis of the size of the margin portion calculated in the margin calculating step; a printing position adjustment amount calculating step (step S12) that calculates a printing position adjustment amount on the basis of the size of the printing end side margin portion set at the time of image printing in a reference direction when the main scanning scale factor of the printer 8 exceeds 100% (NO in step S1); a second printing start position adjusting step (step S13) that adjusts and sets the printing start position on the basis of the printing position adjustment amount calculated in the printing position adjustment amount calculating step; a second printing start side margin adjusting step (step S14) that adjusts and sets the margin at the printing start side on the basis of the printing position adjustment amount calculated in the printing position adjustment amount calculating step; and a second printing end side margin adjusting step (step S15) that adjusts and sets the margin at the printing end side on the basis of the printing position adjustment amount calculated in the printing position adjustment amount calculating step.

The main scanning image adjustment copying step is executed when the main scanning scale factor of the printer 8 has become not 100% as a result of the main scanning scale factor of the printer 8 being adjusted (START).

When the system CPU 9 receives from the control panel 4 the image printing direction, that is, information in regard to which of the forward direction printing mode and the reverse direction printing mode has been selected, then the system CPU 9 determines which of the forward direction printing mode and the reverse direction printing mode has been selected. Then, the CPU 9 sends information of the determined result to the printer CPU 11.

When the main scanning scale factor of the printer 8 is less than 100% (YES in step S1) and the forward direction printing mode has been selected (YES in step S2), then the processing flow proceeds to step S3 and the printing parameters are set (step S3 to step S5).

Specifically, in step S3, the printer CPU 11 sets the printing start position. Here, the printing start position set in step S3 is a position (X). Next, the printer CPU 11 sets the size of the margin at the printing start side in step S4. Here, the size of the margin at the printing start side set in step S4 is Y1. Next, the printer CPU 11 sets the size of the margin at the printing end side in step S5. Here, the size of the margin at the printing end side set in step S5 is Y2.

When the printing parameters—that is, the position (X), the margin (Y1), and the margin (Y2)—have been set in step S3 to step S5, then the processing flow proceeds to step S6 and the printer CPU 11 controls the laser light that the laser unit 13 emits toward the drum 12 on the basis of the set parameters and conducts printing of the image in the forward direction from the set printing start position. When the printing of the image is completed, the processing flow ends (END).

Further, when the main scanning scale factor of the printer 8 is less than 100% (YES in step S1) and the reverse direction printing mode has been selected (NO in step S2), then the processing flow proceeds to step S7 and the margin calculating step is executed.

In the margin calculating step, the printer CPU 11 calculates a size Z1 of the margin portion arising in the printable range from the main scanning scale factor of the printer 8 after main scanning scale factor adjustment (main scanning adjustment scale factor). Z1 can be calculated on the basis of the following numerical expression 1.

Z1=(100%−main scanning adjustment scale factor % of printer 8)×printing length in main scanning direction    (Numerical Expression 1)

Information of the calculation result Z1 is transmitted to the image printing start position adjusting element 16 and the image printing area adjusting element 17 from the printer CPU 11. When the margin calculating step is completed, then the first printing start position adjusting step is executed in step S8.

In the first printing start position adjusting step, the image printing start position adjusting element 16 adjusts and sets the printing start position on the basis of the size of the margin portion calculated in the margin calculating step.

Specifically, using as a reference the position (X) that is the printing start position set in the forward direction mode (reference direction at the time of image printing), it is necessary for the image printing start position adjusting element 16 to shift the printing start position in the forward direction of the printing direction by Z1 that the margin produces. Consequently, in the reverse direction mode (printing direction opposite from the reference direction), the image printing start position adjusting element 16 adjusts the printing start position by Z1 and sets the position (X+Z1).

When the first printing start position adjusting step is completed, then the first printing start side margin adjusting step is executed in step S9.

In the first printing start side margin adjusting step, the image printing area adjusting element 17 adjusts and sets the size of the margin portion at the printing start side on the basis of the size of the margin portion calculated in the margin calculating step.

Specifically, using as a reference the size Y2 of the margin at the printing end side set in the forward direction mode, the image printing area adjusting element 17 sets Y2 as the size of the margin at the printing start side because in the reverse direction mode, the margin at the printing start side becomes the margin at the printing end side at the time of the forward direction mode.

When the first printing start side margin adjusting step is completed, then the first printing end side margin adjusting step is executed in step S10.

In the first printing end side margin adjusting step, the image printing area adjusting element 17 adjusts and sets the size of the margin portion at the printing end side on the basis of the size of the margin portion calculated in the margin calculating step.

Specifically, using as a reference the size Y1 of the margin at the printing start side set in the forward direction mode, the image printing area adjusting element 17 sets Y1 as the size of the margin at the printing end side because in the reverse direction mode, the margin at the printing end side becomes the margin at the printing start side at the time of the forward direction mode.

When the first printing end side margin adjusting step is completed, then the processing flow proceeds to step S6, and when the processing step of step S6 is completed, then the main scanning image adjustment copying step ends (END).

On the other hand, when the main scanning scale factor of the printer 8 exceeds 100% (NO in step S1) and the forward direction printing mode has been selected (YES in step S11), then the processing flow proceeds to step S3, and from step S3 on is executed in the order of step S3, step S4, step S5 and step S6 (END).

Further, when the main scanning scale factor of the printer 8 exceeds 100% (YES in step S1) and the reverse direction printing mode has been selected (NO in step S11), then the processing flow proceeds to step S12 and the printing position adjustment amount calculating step is executed.

In the printing position adjustment amount calculating step, the printer CPU 11 calculates a printing position adjustment amount Z2 on the basis of the size of the printing end side margin portion set at the time of printing in the reference direction. The printing position adjustment amount Z2 can be calculated on the basis of the following numerical expression 2 in view of corresponding to the length, in the main scanning direction, of the excess area 22A shown in FIG. 2A.

Z2=Y2    (Numerical Expression 2)

Here, Y2 is the size of the margin at the printing end side set in the forward direction mode.

Information of the calculation result Z2 is transmitted to the image printing start position adjusting element 16 and the image printing area adjusting element 17 from the printer CPU 11. When the printing position adjustment amount calculating step is completed, then the second printing start position adjusting step is executed in step S13.

In the second printing start position adjusting step, the image printing start position adjusting element 16 adjusts and sets the printing start position on the basis of the printing position adjustment amount calculated in the printing position adjustment amount calculating step.

Specifically, using as a reference the position (X) that is the printing start position set in the forward direction mode, it is necessary for the image printing start position adjusting element 16 to shift the printing start position by Z2 in the negative direction of the printing direction Consequently, in the reverse direction mode, the image printing start position adjusting element 16 adjusts the printing start position by Z2 and sets the position (X-Z2). When the second printing start position adjusting step is completed, then the second printing start side margin adjusting step is executed in step S14.

In the second printing start side margin adjusting step, the image printing area adjusting element 17 adjusts and sets the size of the margin portion at the printing start side on the basis of the size of the margin portion calculated in the margin calculating step.

Specifically, using as a reference the size Y2 of the margin at the printing end side set in the forward direction mode, the image printing area adjusting element 17 sets Y2 as the size of the margin at the printing start side because in the reverse direction mode, the margin at the printing start side becomes the margin at the printing end side at the time of the forward direction mode. When the second printing start side margin adjusting step is completed, then the second printing end side margin adjusting step is executed in step S15.

In the second printing end side margin adjusting step, the image printing area adjusting element 17 adjusts and sets the size of the margin portion at the printing end side on the basis of the size of the margin portion calculated in the margin calculating step.

Specifically, using as a reference the size Y1 of the margin at the printing start side set in the forward direction mode, the image printing area adjusting element 17 sets Y1 as the size of the margin at the printing end side because in the reverse direction mode, the size of the margin at the printing end side becomes the size of the margin at the printing start side set in the forward direction mode. When the second printing end side margin adjusting step is completed, then the processing flow proceeds to step S6, and when the processing step of step S6 is completed, then the main scanning image adjustment copying step ends (END).

The above-described image copying method pertaining to the invention can also be applied not only to when adjustment in the main scanning direction is conduced but also to when adjustment in the sub-scanning direction is conducted.

Figure 4:
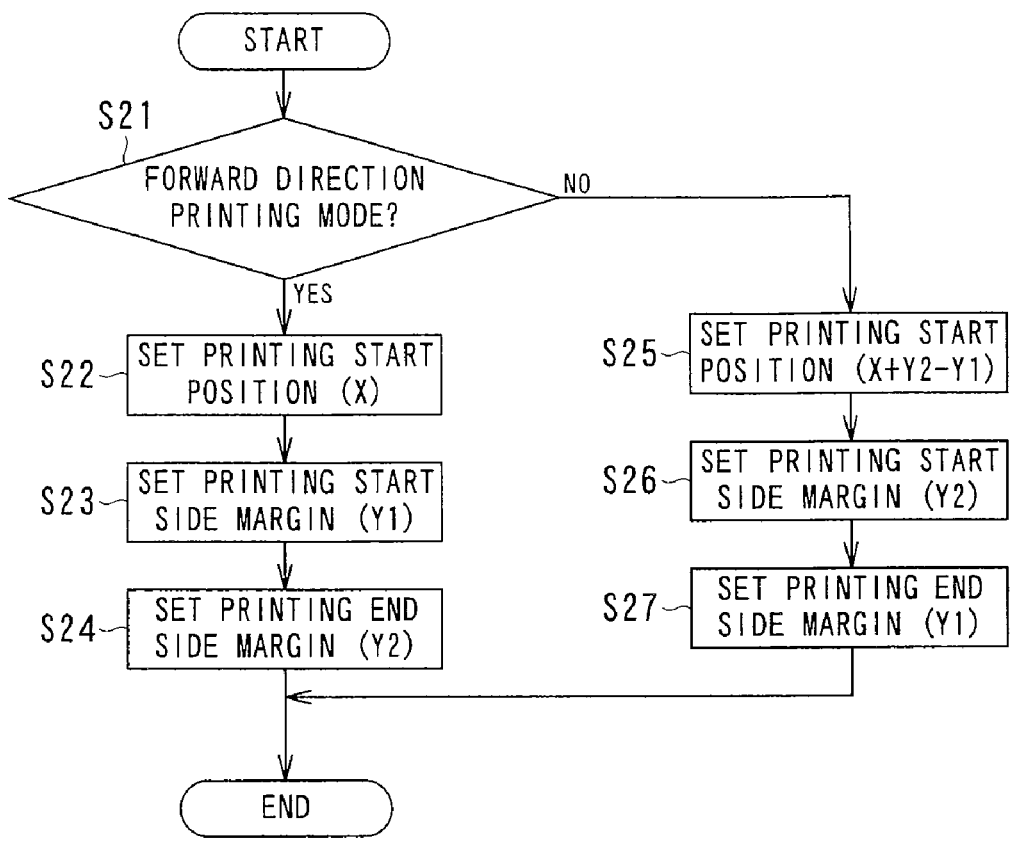
FIG. 4 is a processing flow diagram of an image copying method (when conducting adjustment in a sub-scanning direction) pertaining to the invention.

FIG. 4 is a processing flow diagram of an image copying step (when conducting adjustment in the sub-scanning direction) that the image copying apparatus 1 executes.

The image copying step when conducting adjustment in the sub-scanning direction (below, sub-scanning image adjustment copying step) is different in that it is executed on the assumption that the sub-scanning scale factor of the printer 8 is 100%, but the idea of image copying is the same.

That is, when printing in the forward direction printing mode (YES in step S21), the read image is not rotated, and the printing start position X, the printing start side margin Y1, and the printing end side margin Y2 are applied as they are (step S22 to step S24). Thereafter, printing is outputted (step S25) and the sub-scanning image adjustment copying step ends (END).

Conversely, when printing in the reverse direction printing mode (NO in step S21), the printing start position of an image resulting from the read image being rotated is shifted in the direction of the printing direction by the difference between the printing start side margin Y1 and the printing end side margin Y2 from the position X set in the forward direction printing mode (step S25). That is, the printing start position is set as a position (X+Y2−Y1). Further, the printing start side margin and the printing end side margin are reversely applied (step S26 to step S27). Thereafter, printing is outputted (step S25) and the sub-scanning image adjustment copying step ends (END).

It will be noted that, in the above description, the printing direction when printing in the forward direction printing mode is used as the reference of the image printing direction, but there are also cases where the printing direction when printing in the reverse direction printing mode is used as the reference of the image printing direction. That is, there are also cases where the image copying apparatus 1 adjust the printing start position and the printing area when printing in the forward direction mode.

Further, in the image copying step (when conducting adjustment in the main scanning direction and the sub-scanning direction), processing is executed in the order of setting the printing start position, setting the margin at the printing start side, and setting the margin at the printing end side, but the order in which these three types of parameters are set may be in no particular order.

According to the invention, even when the size of a read image has been adjusted at the time of printing, the printing results of the same manuscript can be made the same as when printing in the reference printing direction, regardless of differences in the printing direction, by adjusting the printing start position and the printing area when printing in the opposite direction of the reference printing direction.

It will be noted that the invention is not limited to the preceding embodiments and that, at the stage of implementation, the constituent elements may be modified and realized in a range that does not depart from the gist of thereof.

What is claimed is:

1. An image copying apparatus comprising:
a control panel that includes an input unit which receives input operations from a user and a display unit which displays information to the user;
a scanner that reads an image;
a memory that stores the image read by the scanner;
an image rotation processing unit that rotates the image in accordance with the direction in which the image is to be printed;
a printer that forms an image, transfers the image to and fixes the image on paper, and discharges the paper;
a printer controller that controls the printer; and
a system controller that controls the image copying apparatus,
wherein the printer is disposed with a laser unit that forms a latent image on a drum, and the laser unit includes
a light-emitting element that emits laser light,
an image printing start position adjusting element that adjusts a start position of a printing position of the image to be printed,
an image printing area adjusting element that sets a printing area of the image to be printed,
a polygon mirror that causes the laser light emitted from the light-emitting element to be reflected toward the drum, and
a polygon motor that drives the polygon mirror,
wherein the printer controller is configured such that when the scale factor in a main scanning direction of the printer is not 100%, the printer controller controls the image printing start position adjusting element and the image printing area adjusting element that adjust the printing start position and the printing area in the main scanning direction when the printer controller conducts printing in a direction different from a printing direction serving as a reference.

2. The image copying apparatus according to claim 1, wherein
the printer controller is configured such that when the printer controller conducts printing in the direction different from the printing direction serving as a reference and the scale factor in the main scanning direction of the printer is less than 100%,
the printer controller uses an adjustment amount that adjusts the printing start position in the main scanning direction as a value obtained by multiplying the printing length in the main scanning direction by the difference between 100% and the scale factor (%) after adjustment in the main scanning direction of the printer,
the printer controller sets a margin amount at a printing start side in the main scanning direction to a margin amount at a printing end side in the main scanning direction set when the printer controller conducts printing in the printing direction serving as a reference, and
the printer controller sets the margin amount at the printing end side in the main scanning direction to the margin amount at the printing start side in the main scanning direction set when the printer controller conducts printing in the printing direction serving as a reference.

3. The image copying apparatus according to claim 1, wherein
the printer controller is configured such that when the printer controller conducts printing in the direction different from the printing direction serving as a reference and the scale factor in the main scanning direction of the printer exceeds 100%,
the printer controller uses an adjustment amount that adjusts the printing start position in the main scanning direction as a value corresponding to a margin amount at a printing end side set when the printer controller conducts printing in the printing direction serving as a reference, the printer controller sets a margin amount at a printing start side in the main scanning direction to the margin amount at the printing end side in the main scanning direction set when the printer controller conducts printing in the printing direction serving as a reference, and the printer controller sets the margin amount at the printing end side in the main scanning direction to the margin amount at the printing start side in the main scanning direction set when the printer controller conducts printing in the printing direction serving as a reference.

4. An image copying apparatus, comprising:

a control panel that includes an input unit which receives input operations from a user and a display unit which displays information to the user;

a scanner that reads an image;

a memory that stores the image read by the scanner;

an image rotation processing unit that rotates the image in accordance with the direction in which the image is to be printed;

a printer that forms an image, transfers the image to and fixes the image on paper, and discharges the paper;

a printer controller that controls the printer; and a system controller that controls the image copying apparatus, wherein the printer is disposed with a laser unit that forms a latent image on a drum, and the laser unit includes a light-emitting element that emits laser light, an image printing start position adjusting element that adjusts a start position of a printing position of the image to be printed, an image printing area adjusting element that sets a printing area of the image to be printed, a polygon mirror that causes the laser light emitted from the light-emitting element to be reflected toward the drum, and a polygon motor that drives the polygon mirror, wherein the printer controller is configured such that when the printer controller conducts printing in a direction different from a printing direction serving as a reference, the printer controller controls the image printing start position adjusting element and the image printing area adjusting element that adjust the printing start position and the printing area in a sub-scanning direction when the printer controller conducts printing in the direction different from the printing direction serving as a reference.

5. The image copying apparatus according to claim 4, wherein the printer controller is configured to use an adjustment amount of the printing start position in the sub-scanning direction as an absolute value of the difference between a margin amount at a printing end side and a margin amount at a printing start side in the sub-scanning direction set when the printer controller conducts printing in the printing direction serving as a reference, to use the margin amount at the printing start side in the sub-scanning direction as the margin amount at the printing end side in the sub-scanning direction set when the printing controller conducts printing in the printing direction serving as a reference, and to use the margin amount at the printing end side in the sub-scanning direction as the margin at the printing start side in the sub-scanning direction set when the printer controller conducts printing in the printing direction serving as a reference.

* * * * *

UNITED STATES PATENT AND TRADEMARK OFFICE
CERTIFICATE OF CORRECTION

PATENT NO. : 7,440,716 B2  Page 1 of 1
APPLICATION NO. : 11/278219
DATED : October 21, 2008
INVENTOR(S) : Kurosawa It is certified that error appears in the above-identified patent and that said Letters Patent is hereby corrected as shown below:

Title Page, Item (57) Abstract, line 1: replace "panel to" with --panel coupled to--.

Signed and Sealed this

Twentieth Day of January, 2009

JON W. DUDAS
*Director of the United States Patent and Trademark Office*